(12) United States Patent
Feix et al.

(10) Patent No.: US 11,036,891 B2
(45) Date of Patent: Jun. 15, 2021

(54) TESTING RESISTANCE OF A CIRCUIT TO A SIDE CHANNEL ANALYSIS

(71) Applicant: ESHARD, Martillac (FR)

(72) Inventors: Benoît Feix, Aubagne (FR); Hugues Thiebeauld de la Crouee, Pessac (FR)

(73) Assignee: ESHARD, Martillac (FR)

( * ) Notice: Subject to any disclaimer, the term of this patent is extended or adjusted under 35 U.S.C. 154(b) by 196 days.

(21) Appl. No.: 16/105,471

(22) Filed: Aug. 20, 2018

(65) Prior Publication Data

US 2019/0057228 A1    Feb. 21, 2019

(30) Foreign Application Priority Data

Aug. 21, 2017 (EP) ..................... 17187086

(51) Int. Cl.
| | |
|---|---|
| *G06F 21/75* | (2013.01) |
| *G09C 1/00* | (2006.01) |
| *H04L 9/00* | (2006.01) |
| *G01R 31/317* | (2006.01) |
| *G06F 7/72* | (2006.01) |

(Continued)

(52) U.S. Cl.
CPC ....... *G06F 21/75* (2013.01); *G01R 31/31719* (2013.01); *G06F 7/723* (2013.01); *G06F 21/556* (2013.01); *G09C 1/00* (2013.01); *H04L 9/002* (2013.01); *H04L 9/003* (2013.01); *H04L 2209/12* (2013.01)

(58) Field of Classification Search
CPC ...... G06F 21/75; G06F 21/556; G06F 21/725; G06F 7/723; G06F 2207/7261; G06F 7/725; G09C 1/00; G01R 31/31719; H04L 9/002; H04L 9/003; H04L 9/3066; H04L 2209/12; H04L 9/0625; G07F 7/082

See application file for complete search history.

(56) References Cited

U.S. PATENT DOCUMENTS

2011/0246119 A1    10/2011   Feix et al.
2017/0270307 A1*   9/2017    Guilley ............... G06F 21/556

OTHER PUBLICATIONS

"Information Technology—Security Techniques—Testing Methods for the Mitigation of Non-Invasive Attack Classes Against Cryptographic Modules"; ISO/IEC 17825:2016, IEC, 3, Rue De Varembe; Jan. 4, 2016; pp. 1-46; XP082000407.

(Continued)

*Primary Examiner* — Kevin Bechtel
*Assistant Examiner* — Sangseok Park
(74) *Attorney, Agent, or Firm* — Brake Hughes Bellermann LLP

(57) ABSTRACT

In a general aspect, a test method can include: acquiring a plurality of value sets, each comprising values of a physical quantity or of logic signals, linked to the activity of a circuit to be tested when executing distinct cryptographic operations applied to a same secret data, for each value set, counting occurrence numbers of the values of the set, for each operation and each of the possible values of a part of the secret data, computing a partial result of operation, computing sums of occurrence numbers, each sum being obtained by adding the occurrence numbers corresponding to the operations which when applied to a same possible value of the part of the secret data, provide a partial operation result having a same value, and analyzing the sums of occurrence numbers to determine the part of the secret data.

24 Claims, 9 Drawing Sheets

(51) Int. Cl.
  *G06F 21/55* (2013.01)
  *H04L 9/30* (2006.01)

(56) References Cited

OTHER PUBLICATIONS

European Search Report for Application No. 17187086.8, dated Mar. 5, 2018, 10 pages.
Goodwill, Gilbert, et al., "A Testing Methodology for Side-Channel Resistance Validation", Goodwill et al.; "A Testing Methodology for Side-Channel Resistance Validation"; Jan. 1, 2011; XP055303563; 16 pages.

* cited by examiner

TESTING RESISTANCE OF A CIRCUIT TO A SIDE CHANNEL ANALYSIS

CROSS REFERENCE TO RELATED APPLICATION

This application claims priority to European Application No. EP17187086.8 dated Aug. 21, 2017, the disclosure of which is incorporated herein by reference in its entirety.

TECHNICAL FIELD

The present disclosure relates to methods for testing a circuit, in particular a circuit designed to handle secret data, and in particular a circuit for transforming a message by an encryption algorithm using a secret key.

The present disclosure further relates to devices implementing cryptographic algorithms, such as secure devices (smart card integrated circuits, secure elements, secured memory cards), mobile devices (mobile phones, smartphones, a device for the Internet of Things—IoT), home automation and automotive devices, and to hardware cryptographic components integrated onto mother boards of computers and other electronic and IT equipment (USB drives, TV decoders, game consoles, etc.), or the like. The present disclosure further relates to software including an encryption operation, provided for being executed in a secure or non-secured environment.

The present disclosure also relates to circuits implementing a cryptographic algorithm such as a ciphering algorithm like DES (Data Encryption Standard) or Triple DES, AES (Advanced Encryption Standard), RSA (Rivest, Shamir and Adleman), DSA (Digital Signature Algorithm), or ECDSA (Elliptic Curve Digital Signature Algorithm). The present disclosure also relates to circuits implementing a hashing function such as HMAC (Keyed-Hash Message Authentication Code).

BACKGROUND

Microcircuits implementing a cryptographic algorithm are equipped with a central processing unit (CPU). Some are equipped with circuits dedicated to cryptographic computing, for example a cryptographic coprocessor. These microcircuits comprise thousands of logic gates that switch differently according to the operations executed. These switches create short variations in current consumption, for example of a few nanoseconds that can be measured. In particular, CMOS-type integrated circuits comprise logic gates that only consume current when they switch, i.e. when a logic node changes to 1 or to 0. Therefore, the current consumption depends on the data handled by the central unit and on its various peripherals: memory, data flowing on the data or address bus, cryptographic coprocessor, etc.

Furthermore, certain software programs, produced in particular using encryption or obfuscation techniques, such as "Whitebox Cryptography" techniques, may integrate secret data in such a way that it is very difficult to determine it by reverse engineering. Certain software programs may also receive secret data from outside through a secure communication channel. Microcircuits may be subjected to so-called side channel analysis attacks based on observing their side-channels such as their current consumption, or their magnetic or electromagnetic radiation, or any other information that can be observed while a cryptographic algorithm is executed. Such attacks aim to discover the secret data they use, in particular their encryption keys.

Similar attacks can be performed on software programs to recover secret data. Instead of observing side-channels from physical measurements, software tools based on simulation or emulation allow to measure or collect all internal states, variables and the contents of registers of the program during its execution.

Frequent side channel attacks implement statistical analysis methods such as SPA ("Single Power Analysis"), DPA ("Differential Power Analysis"), CPA ("Correlation Power Analysis") or EMA ("ElectroMagnetic Analysis"). SPA analysis normally only requires the acquisition of a single current consumption trace. It aims to obtain information about the activity of the integrated circuit by observing the part of the consumption trace corresponding to a cryptographic computation, since the current trace varies according to the operations executed and the data handled.

Software may also undergo such side channel attacks during their execution by a circuit.

DPA and CPA analyses enable the key of an encryption algorithm to be found by acquiring numerous data or measurement traces and by statistically analyzing these traces to find the information searched for. They are based on the premise that the consumption of a CMOS-type integrated circuit varies when a bit changes from 0 to 1 in a register or on a bus, and does not vary when a bit remains equal to 0, remains equal to 1 or changes from 1 to 0 (discharge of the stray capacitance of the MOS transistor). Alternatively, it can be considered that the consumption of a CMOS-type integrated circuit varies when a bit changes from 0 to 1 or changes from 1 to 0 and does not vary when a bit remains equal to 0 or remains equal to 1. This second hypothesis enables the conventional "Hamming distance" or "Hamming weight" functions to be used to develop a consumption model that does not require the structure of the integrated circuit to be known in order to be applicable. DPA analysis involves amplifying this consumption difference using statistical processing on numerous consumption traces, aiming to highlight a measurement difference between two families of consumption traces distinguished according to formulated hypotheses.

CPA analysis is based on a linear current consumption model and involves computing a correlation coefficient between, firstly, the consumption points measured that form the captured consumption traces and, secondly, an estimated consumption value, computed from the linear consumption model and a hypothesis on the variable to be discovered that is handled by the microcircuit and on the value of the encryption key.

Electromagnetic analysis (EMA) is based on the principle that a microcircuit may leak information in the form of near or far field electromagnetic radiation. Given that transistors emit electromagnetic signals when their state changes, these signals can be treated like the current consumption variation signals by an analysis such as one or other of the SPA, DPA and CPA analyses.

Statistical tools, such as "Mutual Information Analysis", (MIA) can be used to perform statistical dependency tests (also called "distinguishers") between the traces and a data leakage model.

Other side channel attacks exist, such as "Template attacks."

An attack can combine side channel techniques and a brute force effort. All of the above-mentioned attacks are based on a time alignment of all the analyzed traces. In other words, all the measurements performed at a given time, for example from the time the execution of a command is activated by the circuit, must correspond to the same value handled by the algorithm.

To protect such circuits and/or cryptographic algorithms they execute against such side channel attacks, counter-measures are generally provided. One type of counter-measure aims to avoid such a time alignment. For this purpose, this type of counter-measure introduces variations in the clock frequency supplied to the calculation circuits, or introduces dummy clock cycles or dummy operations.

Another type of counter-measure involves adapting an algorithm to be protected to render the data handled by the circuit independent of their actual values. Certain counter-measures of this type—that can be referred to as "masking-type counter-measures"—use a random mask (binary number) that is combined with another data to be protected such as the key and/or the message during the execution of the ciphering method. This type of counter-measure is effective but requires the algorithm to be modified, and thus requires a coprocessor specially provided for its implementation in the case of execution by a dedicated coprocessor, or a more complex program in the case of execution by the central processing unit of the microcircuit or a programmed coprocessor. In addition, this type of counter-measure is vulnerable to so-called "second order attacks" which are based on analysis of a set of signal traces each being obtained by combining two parts of a respective trace. As an example, each of these signal traces combines a signal part supposed to hold a leakage related to a data resulting from the combination of a data value to discover and a random mask value, and a signal part supposed to hold a leakage of the random mask value.

To check the level of security offered by a secure integrated circuit intended to be marketed, qualification and/or certification tests are planned before the circuit is marketed, where these tests can comprise in particular tests of the robustness of the integrated circuit to side channel analyses aiming to discover the secret data handled by the integrated circuit. There are also tests enabling the resistance of a software program to side channel attacks to be assessed. A similar approach exists to evaluate and certify secure software programs protected by white-box cryptography techniques.

SUMMARY

Some embodiments relate to a test method comprising: acquiring a plurality of value sets, each value set comprising values of a physical quantity or of logic signals, linked to the activity of a circuit to be tested when the circuit executes an operation of an operation set of distinct cryptographic operations applied to a same data to be discovered; for each value set, counting by a processing unit occurrence numbers of values transformed by a first surjective function applied to values of the value set, to form an occurrence number set for the value set; for each operation of the operation set, and each of the possible values of a part of the data to be discovered, computing by the processing unit results of at least two distinct partial operation; computing by the processing unit for each partial operation result cumulative occurrence number sets, each cumulative occurrence number set being obtained by adding together the occurrence number sets corresponding to the operations of the operation set, which when applied to a same value or equivalent value of the possible values of the part of the data to be discovered, provide a partial operation result having a same transformed value resulting from the application of a second surjective function; combining together the cumulative occurrence number sets corresponding to each partial operation result to obtain combined cumulative occurrence number sets, the combination of the cumulative occurrence number sets being performed as a function of partial operations corresponding to the partial operation results; and analyzing by the processing unit the combined cumulative occurrence number sets to determine the part of the data to be discovered, knowing that if the data to be discovered has leaked into the value sets, it is found in the cumulative occurrence number sets corresponding to the value of the part of the data to be discovered.

According to an embodiment, the method comprises selecting values in each value set, the counting of occurrence numbers being performed on the selected values.

According to an embodiment, the method comprises: transmitting to the circuit a plurality of distinct commands, each command triggering the execution by the circuit of one of the operations of the operation set, applied to the data to be discovered, and during the execution by the circuit of one operation of the operation set, collecting by a measuring device, the values of one of the value sets.

According to an embodiment, the value sets comprise: measurements of current consumption of the circuit, and/or measurements of electromagnetic radiation emitted by the circuit, and/or measurements of absorption of magnetic field present around the circuit, and/or logic signals or digital values collected in the circuit.

According to an embodiment, each of the first and second surjective functions are one of the following functions: an identity function, a function providing a resultant value which is then reduced to a value corresponding to a Hamming weight, a function providing the Hamming weight of the value to which the function is applied, or a function providing a Hamming distance between a value and a preceding value to which the function is applied.

According to an embodiment, the method comprises rejecting the circuit or the program executed by the circuit if the analyzing step determines the part of the data to be discovered.

According to an embodiment, the steps of computing an operation result for each of the possible values of a part of the data to be discovered, of computing the cumulative occurrence number sets, of combining the cumulative occurrence number sets and of analyzing the combined cumulative occurrence number sets are performed for a previously determined part of the data to be discovered and another part of the data to be discovered.

According to an embodiment, the selected values in each value set comprise: consecutive values of the value set, and/or non-consecutive values of the value set, and/or local extremum values of the value set, and/or all the values of the value set.

According to an embodiment, the operations of the operation set comprise applying a single operation to the data to be discovered and to an input data of a set of input data.

According to an embodiment, the partial operations comprise at least a part of the following operations: a symmetrical or asymmetrical encryption or decryption operation, a signature operation, an authentication operation, a modular or non-modular multiplication by the data to be discovered, a logic Exclusive OR operation with the data to be discovered, a modular exponentiation operation, the data to be discovered being used as exponent, a scalar multiplication operation of a secret data by a point on an elliptic curve, a modular reduction operation, the data to be discovered being used as modulus, a substitution operation by a value selected in a substitution table using the input value, an arithmetic operation applied to the data to be discovered, a partial operation performed within an AES or DES round, and an operation combining a logic Exclusive OR operation with the data to be discovered and a substitution operation replacing the result of the logic operation with a value selected in a substitution table using the result of the logic operation.

According to an embodiment, the analysis of the combined cumulative occurrence number sets comprises: for each combined cumulative occurrence number set, computing a normalized cumulative occurrence number by dividing the combined cumulative occurrence number by a corresponding total number of occurrence numbers accumulated in the combined cumulative occurrence number set, for each possible value of the part of the data to be discovered and each value of the transformed partial result, computing a sum of squared differences, between each normalized cumulative occurrence number corresponding to the possible value of the part of the data to be discovered and the value of the transformed partial result, and an average value of the cumulative occurrence numbers, for each possible value of the part of the data to be discovered, computing a cumulative total of difference sums corresponding to the values of the transformed partial results, and comparing with each other the cumulative totals of difference sums, and detecting whether one of the cumulative totals of difference sums for a possible value of the part of the data to be discovered is greater than the other cumulative totals of difference sums.

According to an embodiment, the analysis of the combined cumulative occurrence number sets comprises: for each possible value of the part of the data to be discovered and each value of the transformed partial result, computing a cumulative total of the cumulative occurrence numbers, for each occurrence number in the combined cumulative occurrence number sets, computing a normalized cumulative total by dividing the combined cumulative occurrence numbers by the corresponding cumulative total, and computing the product of the normalized cumulative total by the logarithm of the normalized cumulative total, for each possible value of the part of the data to be discovered and each value of the transformed partial result, computing a sum of the products corresponding to the possible value of the part of the data to be discovered and the value of the transformed partial result, for each possible value of the part of the data to be discovered, computing a cumulative total of the product sums corresponding to the values of the transformed partial results, each product sum being multiplied by an average value of the cumulative total corresponding to the possible values of the part of the data to be discovered and the value of the transformed partial result, and comparing with each other the cumulative totals of product sums, and detecting whether one of the cumulative totals of product sums for a possible value of the part of the data to be discovered is greater than the other cumulative totals of product sums.

Embodiment may also relate to a system for testing a circuit, the system comprising: a measuring device configured to acquire a plurality of value sets, each value set comprising values of a physical quantity or of logic signals, linked to the activity of a circuit to be tested during the execution by the circuit of an operation of an operation set of distinct cryptographic operations applied to a same data to be discovered, and a processing unit configured to implement the method as previously defined.

According to an embodiment, the system comprises a measuring probe coupled to the measuring device for acquiring traces linked to the activity of the circuit.

Embodiment may also relate to a computer program product loadable into an internal memory of a computer and comprising code portions which when executed by a computer configure the computer to carry out the steps of the method as previously defined.

BRIEF DESCRIPTION OF THE DRAWINGS

Examples of embodiments are provided herein for illustration purposes only, and are described below in relation with, but not limited to, the accompanying figures, in which.

DETAILED DESCRIPTION

Figure 1:
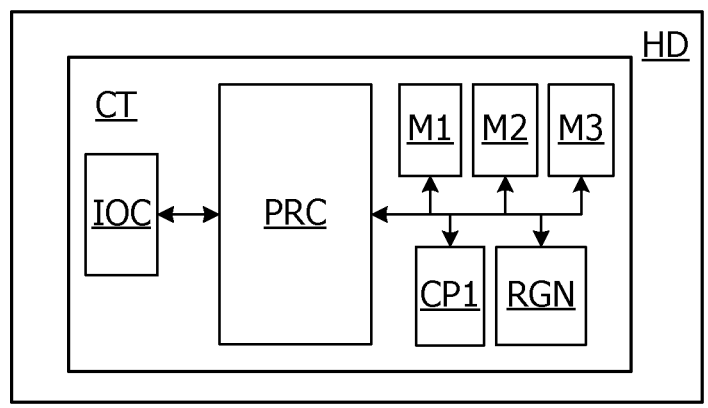
FIG. 1 schematically illustrates a conventional architecture of a secure circuit, FIG. 2 schematically illustrates an example of an integrated circuit testing system.

Some attacks can include combining time signal parts to obtain a signal trace related to the data value to be discovered. However such second order attacks face a difficulty due to the requirement that the combined signal parts need to be strictly aligned in time before being combined. If this requirement is not fulfilled, the combined signal traces may contain useful information, but this information cannot be extracted by conventional statistical analyses. As a consequence, the second order attacks are highly sensitive to countermeasures based on all kinds of time misalignment, such as those causing the duration of the clock cycle pacing the circuit to vary randomly, or introducing dummy processing cycles or operations at times chosen randomly. In optimized processors such as processors embedded in mobile phones, digital tablets, IoT devices or laptops and SOC (Systems on Chip), physical measurements are very noisy and several CPU operations can happen simultaneously.

It is sometimes possible to restore this time alignment, by means of specific expertise and many attempts, in particular using a high number of traces to be realigned or applying some signal processing. Despite the foregoing, cases remain where it is not possible to restore this time alignment, such that the side channel tests fail even though there is a secret data leakage present in the traces.

A counter-measure by multiple executions can be implemented with a conventional coprocessor not including any counter-measure functionality (e.g., means, etc.). It merely involves executing the ciphering method several times by means of false keys or false messages. For this purpose, a counter-measure program may be provided for example that controls the ciphering program or the coprocessor, and makes it execute the ciphering method several times with the false keys or false messages, in a random order, such that the execution of the ciphering method with the right key (i.e. the authentic key) is "hidden" in a set of dummy executions.

This counter-measure by multiple executions offers the advantage that it can be implemented with a conventional coprocessor not comprising any specific counter-measure means.

In view of the drawbacks of current approaches noted above, it may be desirable to have an approach for testing the resistance of a circuit or software program to a side channel analysis, that can in particular detect a secret data leakage without requiring any prior time alignment processing of current consumption traces or of any other physical or logic quantity representative of the circuit's activity. It may also be desirable for this approach to be able to test the robustness of a software program or an application, independently of the circuit in which it is executed.

It may also be desirable for such testing approaches to be integrated into an industrial qualification and/or certification process aiming to check the robustness of circuits or software executed by a given circuit, to side channel analyses and their tightness in terms of information leakage.

FIG. 1 illustrates an example of a secure integrated circuit CT, for example arranged on a portable medium HD such as a plastic card or any other medium, or in a terminal such as a mobile terminal, a smartphone, a laptop, an IoT device or the like. The integrated circuit of this example comprises a microprocessor PRC, an input/output circuit IOC, memories M1, M2, M3 coupled to the microprocessor by a data and address bus and, optionally, a cryptographic computation coprocessor CP1 or arithmetic accelerator, and a random number generator RGN. The memory M1 is a RAM-type ("Random Access Memory") memory containing volatile application data. The memory M2 is a non-volatile memory, for example an EEPROM or Flash memory, containing non-volatile data and application programs. The memory M3 is a read-only memory (or ROM memory) containing the operating system of the microprocessor.

The communication interface circuit IOC may be of contact type, for example according to the ISO/IEC 7816 standard, of contactless type with inductive coupling, for example according to the ISO/IEC 14443A/B or ISO/IEC 13693 standard, of contactless type by electrical coupling (UHF interface circuit), or of both contact and contactless type. The interface circuit IOC may also be coupled through a specific interface, to another circuit such as an NFC (Near-Field Communications) controller, or a main circuit of a terminal such as a mobile terminal or a connected object.

In some embodiments, the integrated circuit CT may be configured to execute operations of ciphering, deciphering, authenticating (HMAC) or signing of messages that are sent to it, by means of an encryption function. This encryption function may be executed by the processor PRC of the circuit CT or partially or totally carried out by the processor PRC to the coprocessor CP1.

Figure 2:
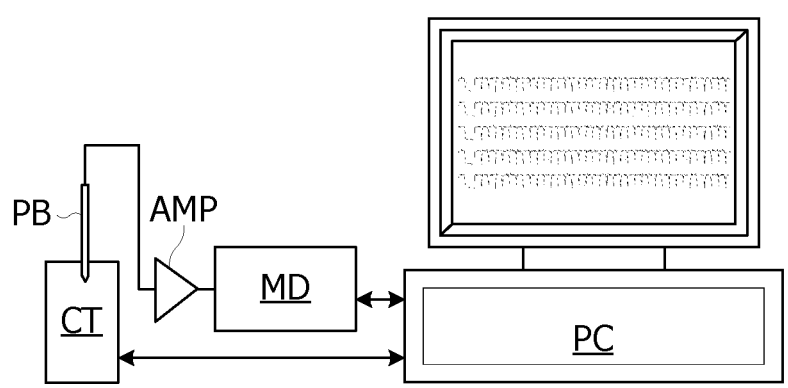

FIG. 2 illustrates an example of an integrated circuit testing system provided to implement the test method, according to one embodiment. It will be assumed as an example that the testing system is configured to test the integrated circuit CT in FIG. 1.

The testing system of FIG. 2 comprises a measuring probe PB coupled to a measuring device MD such as a digital oscilloscope, to acquire traces relating to the activity of the circuit, such as traces of current consumption or of electromagnetic signal variation, and a computing device, such as a personal computer PC. The computer PC is coupled to the measuring device and implements a test program. This test program comprises in particular a communication interface and a program for communicating with the integrated circuit and for sending it messages, a signal processing program and a program for implementing a computation method, such as one of the method described below. Steps, as used herein, can refer to operations, functions, processes, etc. In the event that the integrated circuit is a contactless circuit, the communication interface may comprise a contactless card reader.

The probe PB may be a current probe (for example a resistor placed on the supply terminal Vcc of the integrated circuit), or an electromagnetic probe coupled to the measuring device by a signal amplifier AMP. Alternatively, a current probe may be combined with an electromagnetic probe. The study of electromagnetic radiation indeed shows that an electromagnetic field emitted by a circuit in operation gives information about bit switches in the integrated circuit, just like the measurement of the consumed current. The advantage of an electromagnetic probe is that it may be placed near the part of the circuit whose operation needs to be analyzed (for example near the core of the microprocessor PRC or of the cryptographic computation coprocessor CP1).

Furthermore, in the case of a contactless integrated circuit, the probe may be replaced with an inductive probe that measures the absorption, by the integrated circuit, of the magnetic field emitted by the reader. Such an inductive probe, for example an antenna coil, can itself be combined with an electromagnetic field probe placed near the circuit zones to be studied.

Therefore, in the present application, the phrase "current consumption", used for the sake of simplifying the language, can refer to any measurable physical quantity of which the variations over time are representative of the switches of binary data inside the integrated circuit or inside the studied part of the integrated circuit, the physical quantity being able to be measured at the terminals of the integrated circuit or near the studied part of the integrated circuit. Furthermore, the physical quantity is sampled with a sampling frequency sufficiently high to collect several points per data period of interest, which, in practice, can result in traces containing from 10 to a few hundred thousand points per trace, but it may be considered to collect up to several million values or even more per trace.

The present application also relates to a method for testing a software program or an application protected by white-box cryptography. In this case, the software program to be tested may be executed directly by the testing system or by an emulation program executed by the testing system. The analyzed traces may thus for example be series of values transmitted to a memory when accessing a memory or data handled in registers of the circuit, or even can be data transmitted to a communication interface of the circuit, where these transmissions can be controlled by the tested software program.

Some embodiments of a test method can be based on a detailed review of traces of variation over time of signals or digital values, representative of the operation of the circuit to be tested while it executes an operation applied to data to be discovered, called in the following "secret data".

Figure 3:
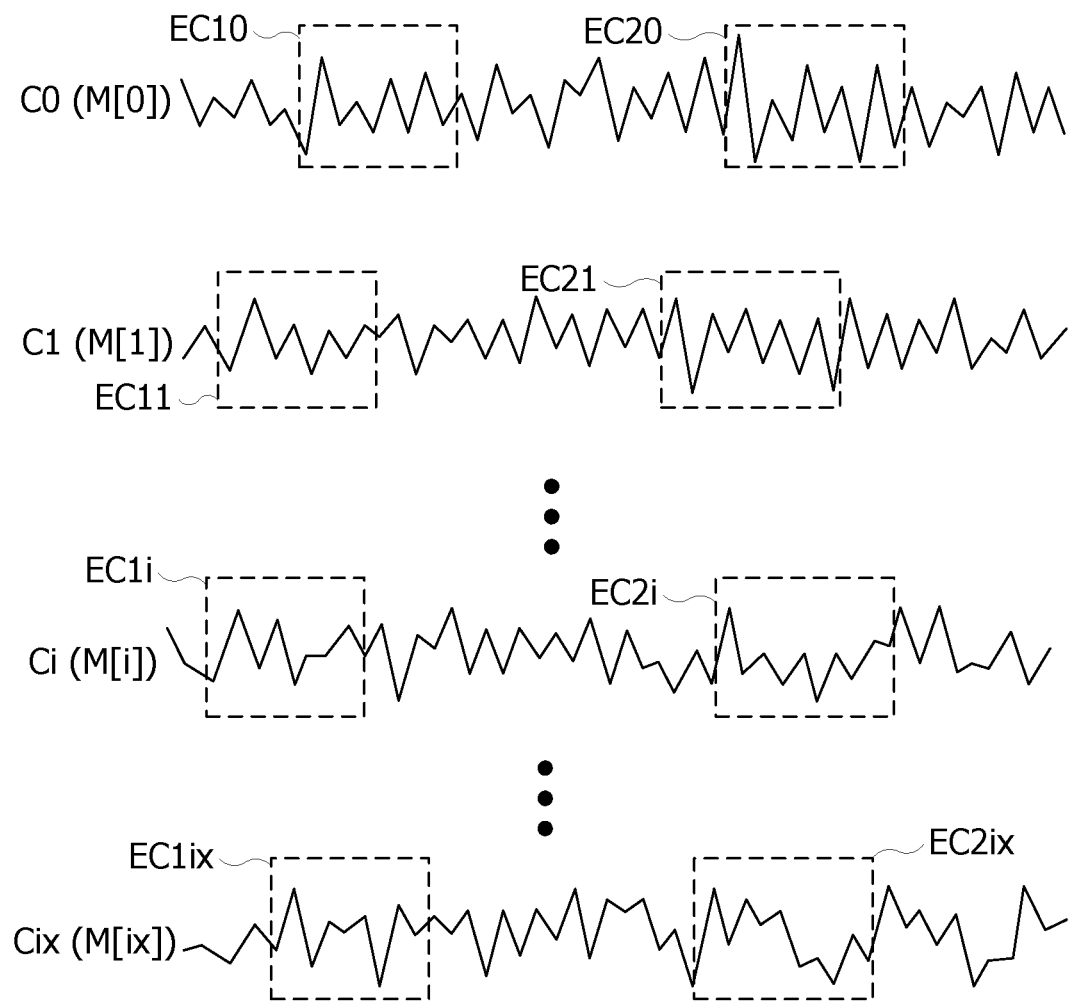
FIG. 3 illustrates examples of traces of a signal acquired during the execution of an encryption operation by a secure circuit.

FIG. 3 illustrates examples of traces $C0, C1, \ldots Cix$ of values over time, that can be acquired by the testing system. Each of these traces can be obtained by causing an operation to be executed by the circuit or the software program to be tested. The operations corresponding to the traces $C0, C1, \ldots Cix$ are generally all different. These operations are different for example because they receive distinct known input data, for example messages to be ciphered, deciphered or signed or a signature to be checked, or a HMAC (keyed- Hash Message Authentication Code) to be computed. Alternatively, the known data may be output data of the operation, or a part of the input or output data of this operation, rather than input data thereof.

The operation may be any operation applied to a same secret data SD, and to an input data M, such as a symmetrical or asymmetric ciphering or deciphering operation, or a signature operation, or merely a modular or non-modular multiplication, by the secret data (M×SD), a logic XOR operation (Exclusive OR) with the secret data (M XOR SD), a modular exponentiation operation, the secret data being used as exponent (MSD mod n, n being known), or a modular reduction operation, the secret data being used as the modulus (M mod SD), such as in an asymmetric ciphering or deciphering operation. Another example of an operation involves processing the result of an XOR operation with a substitution table (SBOX[M XOR SD], SBOX being the substitution table), as in the case of the DES and AES cryptographic algorithms. The operation may also be a scalar multiplication operation [SD].P of a secret integer number SD by a point P on an elliptic curve. More generally, this operation should enable a part of the value resulting from the operation to be computed based on a part of the secret data and an input data.

In the example of FIG. 3, the traces C0, C1, Ci, Cix respectively correspond to the input (or output) data M[0], M[1], . . . M[i], . . . M[ix]. Each of the traces Ci can be formed of samples acquired from a same signal measured on a same circuit under test, or can comprise samples from different signals, captured when the circuit under test manipulates the data M[i].

Figure 4A:
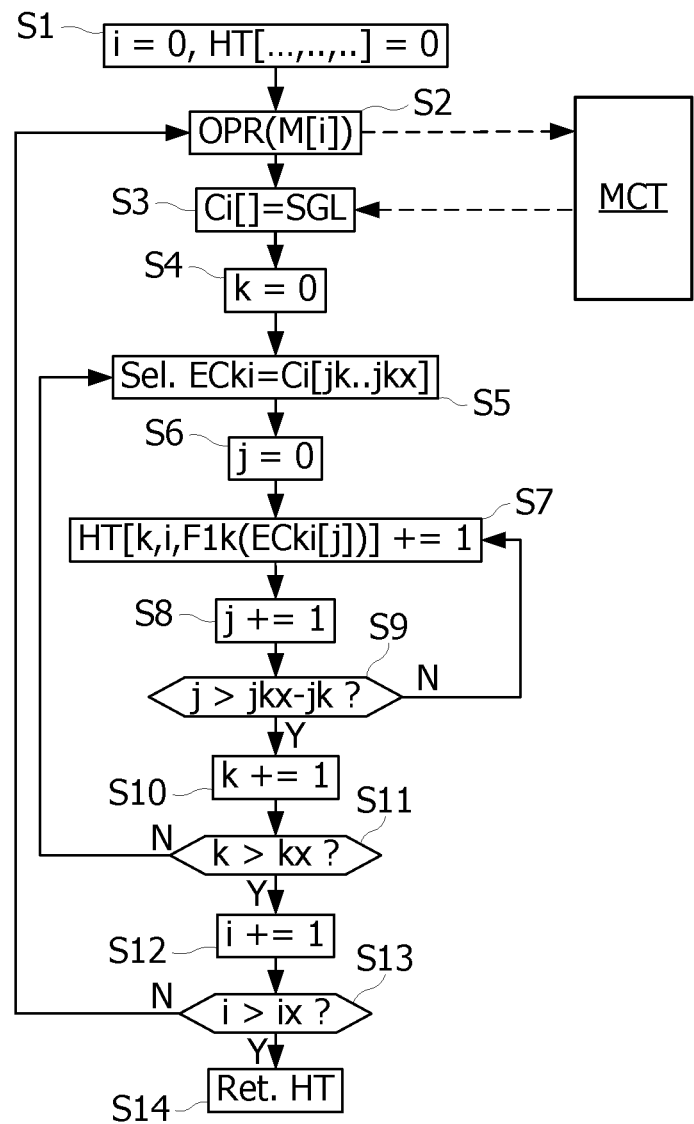
FIGS. 4A, 4B, 4C illustrate a method for testing a secure circuit, according to one embodiment.

FIG. 4A illustrates steps S1 to S14 of processing the values collected by the testing system during the execution of a set of cryptographic operations, for example an encryption or decryption (or signature or HMAC authentication) operation OPR assumed to be known, applied to a secret data to be discovered, and possibly to a set of input data M[0] . . . M[ix] also known. According to one embodiment, the aim of this test is to determine whether the value of a part of the secret data leaks into (e.g., can be determined from) the collected values forming the traces of FIG. 3, for example.

The processing unit PC first executes steps S1 to S9. In step S1, the processing unit PC of the testing system sets an index i of a loop on the input data M[0] . . . M[ix] to 0. In step S1, a table HT is also initialized. In step S2, the processing unit PC activates the execution of an operation OPRK by the circuit MCT or the software program to be tested, this operation receiving for example the data M[i], the secret data being provided to the operation by the circuit MCT or the software program. In step S3, the processing unit PC collects the values constituting the trace Ci. In step S4, an index k is set to 0. The index k designates a partial result or partial operation of a set of selected partial or intermediary results or partial operations of the operation OPR, from which a part of the secret data is to be determined. At step S5, a part ECki of the values of the trace Ci is selected for a partial result k of the operation OPR, with only this part being processed in the following processing steps (FIG. 3). In the example in FIG. 4A, the part ECki is delimited by the values of the trace Ci corresponding to the indices jk and jkx, for the sake of simplicity. In reality, the indices jk and jkx may vary from one trace Ci to the next. In addition, the values thus selected in each trace are not necessarily consecutive, and the number of values in each part ECki, may be different from one trace Ci to the next, in contrast with prior side-channel analyses. Hence, it may be decided, for example, to extract only maximum or minimum local values from each trace. It shall also be noted that the extracted part ECki may be the entire trace Ci. In the following processing, the data thus extracted are assumed to contain a piece of information concerning a partial result of the operation OPR, computed using a part of the secret data that is being searched for.

The partial result can be a processor word of the result of an AES or DES round, a processor word of the result of one or a part of the operations of AES or DES, such as AddRoundKey, SubBytes, MixColumns. For example, MixColumns operation computes and manipulates processor words X, 2·X and 3·X, which can be considered as partial results. In asymmetric cryptography, processor words computed when performing long integer multiplications (on several processor words) or long integer modular operations (additions, subtractions, multiplications or exponentiations) can be considered as partial results.

Figure 5:
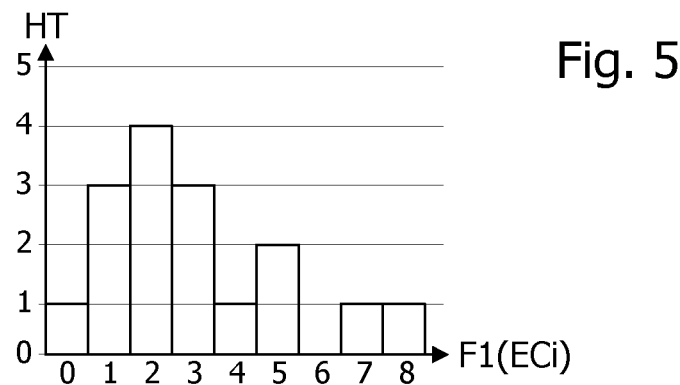
FIG. 5 illustrates in graph form, an example of a surjective function, FIG. 6 schematically illustrates a table built according to one embodiment, to perform statistical processing.

In step S6, the processing unit PC sets a loop index j to 0. In step S7, the processing unit PC applies a surjective function F1$k$ to the value ECki[j] of index j of the selected trace part ECki and increments by one (1) a value in the 3-dimensional table HT, designated by the indexes k and i, and by an index equal to the result provided by the function F1$k$. In step S8, the index j is incremented by one (1). In step S9, the index j is compared with its maximum value to determine whether all the values of the set ECki have been processed. Once all the values of the set ECki have been processed, the processing unit PC executes the steps S10 and S11, otherwise it executes the steps S7 to S9 again. In this way, the values of the set ECki loaded in the table HT[k,i] have the form of a histogram specifying the occurrence number of each possible value returned by the function F1$k$, such that the time feature related to the values of the set ECki is not included in the table HT[k,i]: the content of the table HT[k,i] does not enable the order in which the values of the set have been collected to be determined. FIG. 5 illustrates an example of a table HT[k,i] in the form of a graph occurrence numbers (in the y axis) of values (in the x axis) computed using the function F1$k$. In the example of FIG. 5, the function F1$k$ returns the Hamming weight computed from 8-bit encoded values.

In step S10, the processing unit PC increments index k by one (1). In step S11, the index k is compared with its maximum value kx to determine whether all the sets ECki have been processed for one trace Ci. Once all the sets ECki have been processed, the processing unit PC executes the steps S12 and S13, otherwise it executes the steps S5 to S11 again. In step S10, the processing unit PC increments index k by one (1). In step S12, the index i is compared with its maximum value ix to determine whether all the traces Ci have been processed. Once all the traces Ci have been processed, the processing unit PC executes step S14, otherwise it executes the steps S2 to S13 again. In step S14, the table HT is provided to following steps illustrated in FIG. 4B.

Figure 4B:
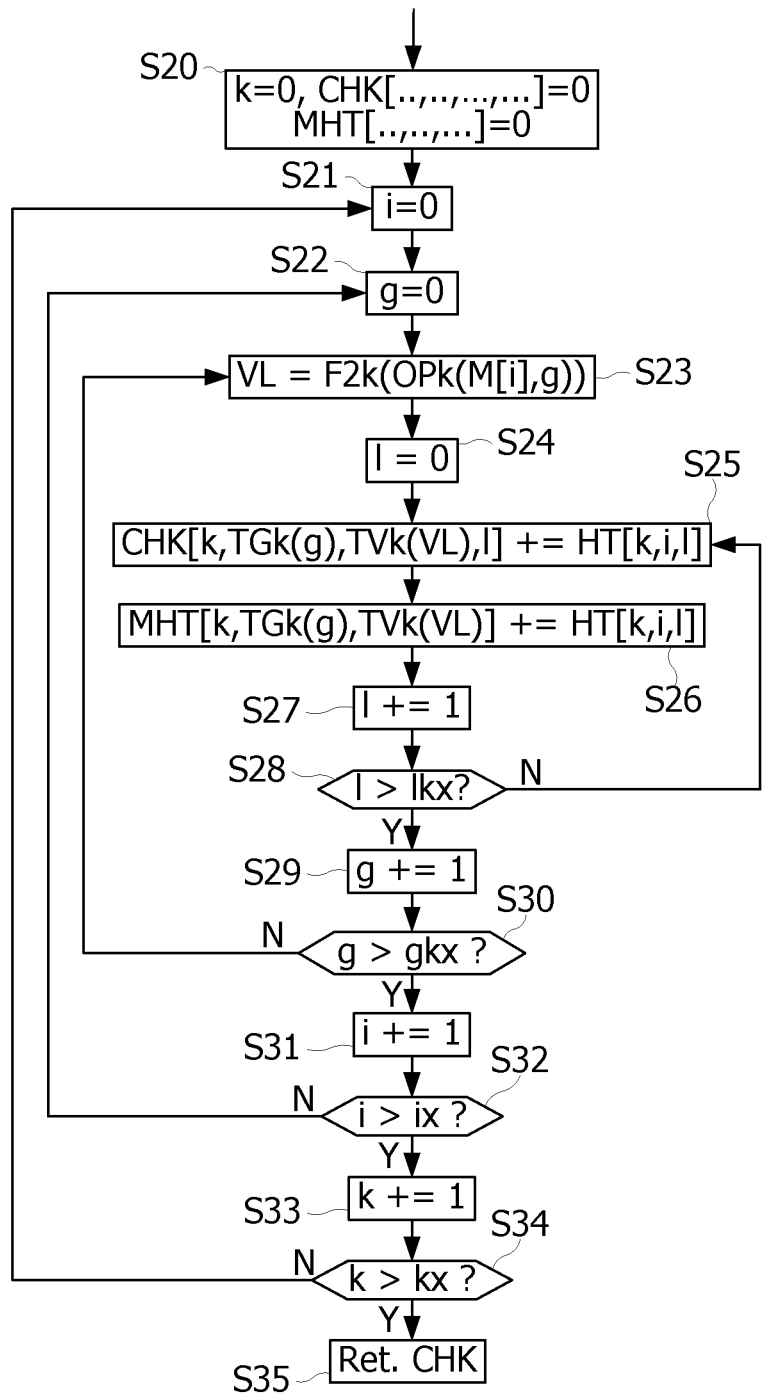

FIG. 4B illustrates steps S20 to S35 of processing the table HT. The processing unit PC first executes steps S20 to S28. In step S20, the processing unit PC sets an index k to 0. In step S20, tables CHK and MHT are also initialized. In step S21, the processing unit PC sets index i to 0. In step S22, the processing unit PC sets index g to 0. In step S23, the processing unit PC computes the partial result corresponding to the operation executed for the trace Ci and a part of the secret data SD to be determined which is supposed here to be equal to the index g. In the example of step S23, the partial result of the operation OPR is computed by applying an operation OPk to the data M[i] and to the part of the secret data SD set to be equal to the index g. The operation OPk(M[i], g) may provide a part of the result of the operation OPR(M[i]) (=OPR(M[i], SD)) executed in step S2. The result provided by the operation OPk is processed by a surjective function F2k that supplies a value VL. In step S24, the processing unit PC sets index I to 0. In step S25, the processing unit PC increments a value stored in the 4-dimensional table CHK, at a location designated by the indices k, TGk(g), TVk(VL) and I, by the value HT[k,i,I] at the indexes k, i and I in the table HT corresponding to the data M[i]. TGk(g) and TVk(VL) are transformations depending on the partial operation k such that the indexes g and VL are comparable between all the partial operations of the selected partial operations.

Figure 6:
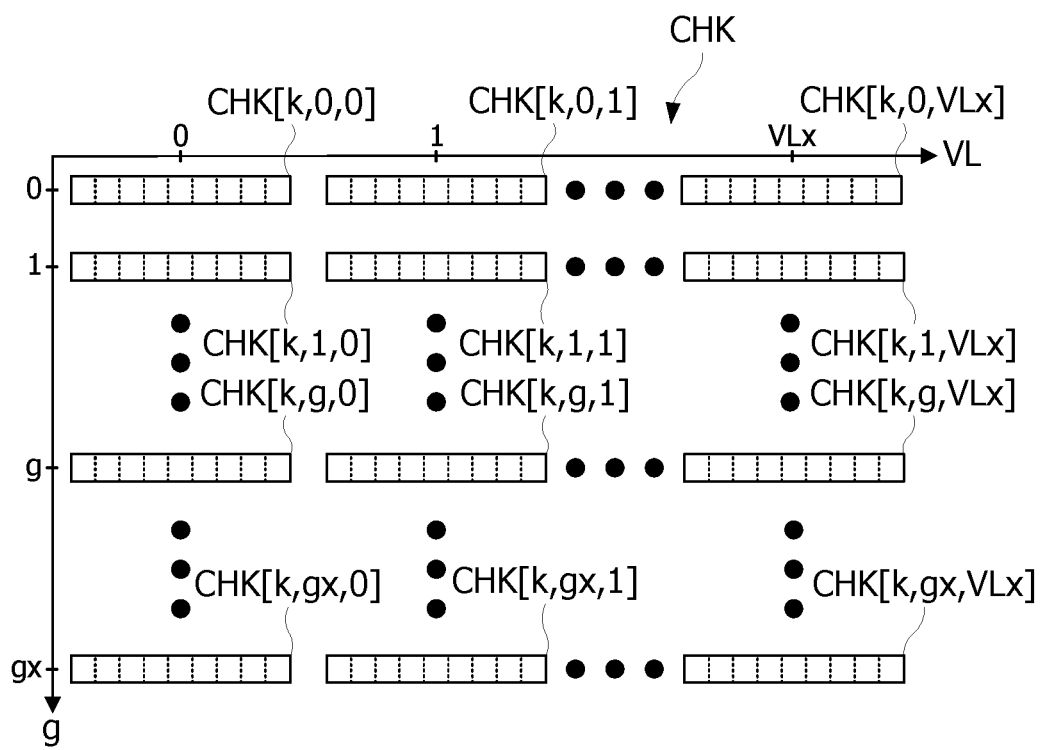

FIG. 6 illustrates an example of a table CHK in which each location CHK[g,VL] designated by the indices g and VL contains a table obtained by combining several tables HT according to the values TGk(g) and TVk(VL), VL being obtained in step S23. In step S26, the element MHT[k,TGk(g),TVk(VL)] in the table MHT designated by the indexes k, TGk(g) and TVk(VL) is incremented by the value HT[k,i,I] at the indexes k, i and I in the table HT. In step S27, the index I is incremented by one (1).

In step S28, the index I is compared with its maximum value Ikx considering the number of possible distinct values provided by the function F1k used in step S7. If the index I is lower than or equal to its maximum value Ikx, steps S25 to S28 are executed again, otherwise (when index I is greater than its maximum value Roc), steps S29 and S30 are executed.

In step S29, the processing unit PC increments the index g by one (1). In step S30, the processing unit PC compares the index g with its maximum value gkx depending on the partial operation k, considering the number of possible distinct values for the considered part of the secret data. If the index g is lower than or equal to the maximum value gkx, a new iteration from step S23 to step S30 is executed, otherwise (when index g is greater than its maximum value gkx), steps S31 and S32 are executed. In step S31, the processing unit PC increments the index i by one (1) to process another table HT[k,i]. In step S32, the processing unit PC compares the index i with its maximum value ix corresponding to the number of traces Ci generated. If the index i is lower than or equal to the maximum value ix, steps S22 to S32 are executed again, otherwise (when index i is greater than its maximum value ix), step S33 and S34 are executed. In step S33, the processing unit PC increments the index k by one (1) to process another partial operation k. In step S34, the processing unit PC compares the index k with its maximum value kx corresponding to the number of selected partial operations of the operation OPR. If the index k is lower than or equal to the maximum value kx, steps S21 to S34 are executed again, otherwise (when index k is greater than its maximum value kx), step S35 is executed. In step S35, the table CHK is provided to following steps illustrated in FIG. 4C. In step S35, each table of cumulative totals contained in the table CHK at the location [k,TGk(g),TVk(VL)] contains the following values:

$$CHK[k, TGk(g), TVk(VL), 0 \ldots Ix] = \sum_{M[i]} HT_{M[i]}[k, i, 0 \ldots Ix] \quad (1)$$

the data M[i] to be taken into account in the above sum being such that F2k(OPk(M[i],g))=VL.

Figure 4C:
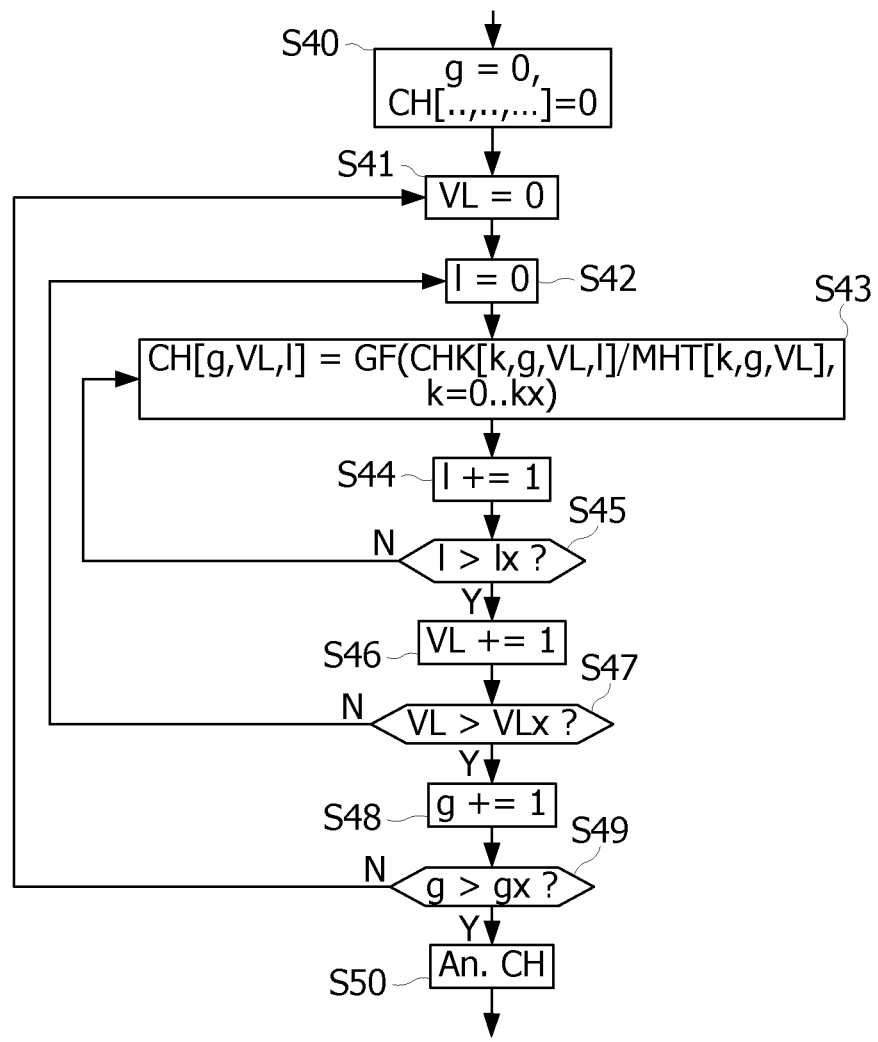

FIG. 4C illustrates steps S40 to S50 of processing the table CHK. The processing unit PC first executes steps S40 to S46. In step S40, the processing unit PC sets index g to 0 and initializes a table CH. In step S41, the processing unit PC sets index VL to 0. In step S42, the processing unit PC sets index I to 0. In step S43, the processing unit PC computes for each value of the index k (between 0 and kx) the ratio CHK[k,g,VL,I]/MHT[k,g,VL] of the value CHK [k,g,VL,I] at the indexes k, g, VL and I in the table CHK, divided by the value MHT[k,g,VL] in the table MHT at the indexes k, g and VL in the table MHT. The computed ratios CHK[k,g,VL,I]/MHT[k,g,VL] which represent probability densities corresponding to respective partial results or operations k are combined together by a function GF and stored in the 3-dimensional table CH, at a location designated by the indices g, VL and I. The function GF can subject each of the computed ratio to a transformation depending on the partial operation k such that the function GF can combine comparable data. In the simplest case, the transformation GF is a simple addition of the computed ratios.

In step S44, the index I is incremented by one (1). In step S45, the index I is compared with its maximum value Ix considering the number of possible distinct values provided by the functions F1k depending on all the partial operations k. If the index I is lower than or equal to its maximum value Ix, steps S43 to S45 are executed again, otherwise (when index I is greater than its maximum value Ix), steps S46 and S47 are executed. In step S46, the index VL is incremented by one (1). In step S47, the index VL is compared with its maximum value VLx considering the number of possible distinct values provided by the functions F2k and TVk depending on the partial operations k. If the index VL is lower than or equal to its maximum value VLx, steps S42 to S47 are executed again, otherwise (when index VL is greater than its maximum value VLx), steps S48 and S49 are executed. In step S48, the index g is incremented by one (1). In step S49, the index g is compared with its maximum value gx considering the number of possible distinct values provided by the transformations TGk depending on the partial operations k. If the index g is lower than or equal to its maximum value gx, steps S41 to S49 are executed again, otherwise (when index g is greater than its maximum value gx), step S50 is executed.

In step S50, the processing unit PC performs a statistical analysis of the table CH to determine whether a value of the index g corresponds to the part of the secret data searched for. For this purpose, it is considered that the information resulting from a leakage of the secret data have been accumulated in the locations of a row g of the table CH, whereas the information independent from the secret data is distributed randomly or uniformly in the table CH. As a result, if a row of index g of the table CH contains higher values than in the rest of this table, the value of the index g at this row of the table CH corresponds to the value of the part of the secret data SD searched for. In this case, it can be considered that the secret data SD has leaked into the collected data forming the traces Ci.

The functions F1k and F2k may vary for each partial operation or operation result k and can be chosen so as to correspond to the leakage pattern of the circuit or the software program to be tested when the partial operation is executed. Therefore, the functions F1k and F2k may be the same or different from each other, and may be chosen to maximize (increase, etc.) the probability of discovering a secret data manipulated by the circuit. For example, each of the functions F1$k$ and F2$k$ may be one of the following functions:
- the identity function,
- a function (e.g. in the form F(x)=a·x+b), with a resultant value that could be reduced to a value corresponding to a Hamming weight, for example between values 0 and 8 when x is encoded on 8 bits,
- a function that computes a Hamming weight of a value provided at input of the function, for example the number of bits at 1 of the binary coded value, or
- a function that computes a Hamming distance with another value, for example the difference between the numbers of bits at 1 of these two values.

It is noted that the choice of the functions F1$k$ and F2$k$ may impact both the complexity of the statistical processing of the table CH to be performed to determine the considered part of the secret data, and the success of the statistical processing to determine the value of the part of the secret data searched for.

The part of the secret data searched for by executing steps of FIGS. 4A, 4B, 4C may for example be defined on 8 or 16 bits. In the case of 8 bits, the index g is successively allocated to all the values between 0 and 255 (or 1 and 256=28). It is noted that the order in which the values of g are tested is not significant for the result of the test. The part of the secret data searched for may also be defined on wider words such as on 16, 32 or 64 bits, or on smaller words such as 4 or 6 bits.

Another part of the secret data SD may be determined by executing steps of FIGS. 4A, 4B, 4C using the values of the previously determined parts of the secret data, and by forcing another part of the secret data to the different possible values of the index g. For this purpose, the same parts ECki of the traces Ci or other parts of these traces can be extracted in step S5.

It is noted that the value sets forming the traces Ci may have been collected (steps S2 and S3) before executing the other steps in FIG. 4A.

The operation OPR applied to the secret data SD and to the input data M[i] may be one or a combination of the following operations:
- a symmetrical or asymmetrical encryption or decryption operation, the secret data SD being the encryption or decryption key,
- a cryptographic operation involving an elliptic curve,
- an authentication operation such as a message authentication code computation (i.e. HMAC), and
- a signature operation or signature verification, using the secret data SD.

The partial operations k may be one or a combination of the following operations:
- a modular or non-modular multiplication by the secret data (M[i]×SD),
- an XOR logic operation (Exclusive OR) with a part of the secret data and a part of the input data (M[i] XOR SD),
- a partial operation of a modular exponentiation operation, the secret data SD being used as exponent (M[i]$^{SD}$ mod n, n being known),
- a partial operation of a modular reduction operation,
- a substitution operation by a value selected in a substitution table using a part of the input data (SBOX[M[i]], SBOX being the substitution table), and
- an operation combining an XOR logic operation applied to a part of the secret data and the substitution operation replacing the result of the logic operation with a value selected in a substitution table using the result of the XOR operation (SBOX[M[i] XOR SD]),
- an operation processing a processor word in an AES or DES round, such as AddRoundKey, SubBytes, MixColumns,
- an operation combining an arithmetic operation (addition, subtraction) operation applied to a part of the secret data.

More generally, this operation should enable a part of the final value of the operation to be computed based solely on a part of the secret data and an input data.

For example, the MixColumns operation of AES algorithm manipulates processor words X, 2·X and 3·X where X=SBOX(M[i] XOR g) and g is one byte of the secret data SD. The partial results combined at step S43 can be computed at step S23 by performing the operation VL=SBOX (M[i] XOR g (k=0), 2·VL (k=1) and 3·VL=2·VL XOR VL (k=2).

$$CH[g, VL, I] = \sum_{k=0}^{kx} \left[\frac{CHK[k, g, VL, I]}{MHT[k, g, VL]}\right] \quad (2)$$

According to another example, it is usual that a value X leaks during the execution of an algorithm, and the same value leaks in another way, like X XOR 0xFF for instance. It is possible to aggregate the probability density functions by combining the values of the table CHK as follows:

$$CH(VL,g)=CH K(k=0,VL,g)+CHK(k=1,8-VL,g),$$

for each VL=0 . . . 8 and g=0 . . . 256.

According to another example directed to the DES algorithm, different intermediate values are manipulated along one round execution. The partial results combined at step S43 can be computed at step S23 for index k by performing the operation X=SBOX(g XOR EP(R0[i])), where EP is the DES expansive permutation, and R0[i] is the left 32-bit part of the 64-bit of the input word M[i]. When index k=0, VL=SBOX(g XOR EP(R0)[i]) is a word of 4 bits related to 6 bits g of the 1st round key. When k=1, VL=EP(R1[i]), is the input of the XOR operation at the beginning of the 2nd round estimating a word of 6 bits related to the same 6 bits g of the 1st round key. In this example, the functions F1$k$, F2$k$ and TV$k$ can be the function giving the Hamming weight of a binary value. The functions TG$k$ and GF can be defined to transform a Hamming weight of a 6-bit word to a Hamming weight of a 4-bit word, such that (for each value of indexes g and I):

$$CH(VL=0)=CHK(k=0,VL=0)+CHK(k=1,VL=0), \quad (3)$$

$$CH(VL=1)=CHK(k=0,VL=1)+CHK(k=1,VL=1), \quad (4)$$

$$CH(VL=2)=CHK(k=0,VL=2)+CHK(k=1,VL=2)+ CHK(k=1,VL=3)+CHK(k=1,VL=4), \quad (5)$$

$$CH(VL=3)=CHK(k=0,VL=3)+CHK(k=1,VL=5), \quad (6)$$

$$CH(VL=4)=CHK(k=0,VL=4)+CHK(k=1,VL=6). \quad (7)$$

Each value of the table CHK above can be divided by the corresponding value of the table MHT according to equation (2).

Another example is directed to an asymmetrical cryptography algorithm using long integer multiplications, i.e. multiplication of long binary words encoded on more than one processor word. Generally, the long integer multiplication algorithms divide the long binary words to be multiplied into processor words which are multiplied together. An example of algorithm of multiplication of a long integer word X[0 ... b] of b+1 binary words by another long integer word Y[0 ... b] of b+1 binary words is shown below:

---
Algorithm 1
---
```
For bx = 0 to 2b+1, W[bx] = 0
For bx = 0 to b, do:
    C = 0
    For by = 0 to b, do:
        UV = W[bx+by]+X[bx]·Y[by] + C
        W[bx+by] = V
        C = U
    End For
    W[bx+b] = C
End For
Return W
```
--- where W[bx], X[bx], Y[by], U and V represent processor binary words or binary words smaller of the same size.

The partial results combined at step S43 can be computed at step S23 for the values of index k by computing the words X[bx], Y[bx], W[bx], UV and/or C and for one of more of the values of bx from 0 to b for X and Y, and from 0 to 2b+1 for W. In this example, the functions F1$k$, F2$k$, TV$k$ and TG$k$ can be the identity function, and the function GF used at step S43 can perform a sum of each value CHK[k,g,VL,I] or a sum of each value CHK[k,g,VL,I] divided by MHT[k,g,VL] for each value of the index k according to equation (2).

Asymmetrical cryptography algorithms can use modular exponentiation operations applied to long binary words encoded on more than one processor word. An example of modular exponentiation algorithm of a long integer word X[0 ... b] of b+1 binary words by another long integer (d+1)-bit word D[0 ... d] modulo a modulus N[0 ... n] of n+1 binary words is shown below:

---
Algorithm 2
---
```
A = 1
For dx = d to 0, do
    A = (A·A) mod N
    If D[dx] = 1 then A = (A·X) mod N
End For
Return A
```
--- where X[bx] and N[bn] represent processor binary words or binary words smaller of the same size (with bx=0, ... b and bn=0, ... n), A·A and A·X are long modular integer multiplications performed for example according to algorithm 1 and D[dx] represents one bit of the exponent D.

The partial results combined at step S43 can be computed at step S23 for the values of index k by computing the words X[bx] and A[bx] for one of more of the values of bx from 0 to b, where X[bx], A[bx] are processor words or words smaller of the same size, and for several supposed values or all possible values of a part of the exponent bits D[dx]. In this example, the functions F1$k$, F2$k$, TV$k$ and TG$k$ can be the identity function, and the function GF used at step S43 can perform a sum of each value CHK[k,g,VL,I] or a sum of each value CHK[k,g,VL,I] divided by MHT[k,g,VL] for each value of the index k according to equation (2).

For a cryptographic algorithm based on an elliptic curve, the modular exponentiation is replaced by a scalar multiplication of a point on an elliptic curve performed by modular arithmetic operations. All the partial results provided by these modular arithmetic operations can be used to compute the partial results at step S23.

The statistical analysis applied to the table CH can consider that this table contains a distribution of probability densities and measure dependency between this distribution and a reference distribution computed from the supposition of a value for the secret data part searched for. To measure dependency between two distributions, the statistical analysis can implement statistical tests such as CHI-squared test, and mutual information test.

Figure 7:
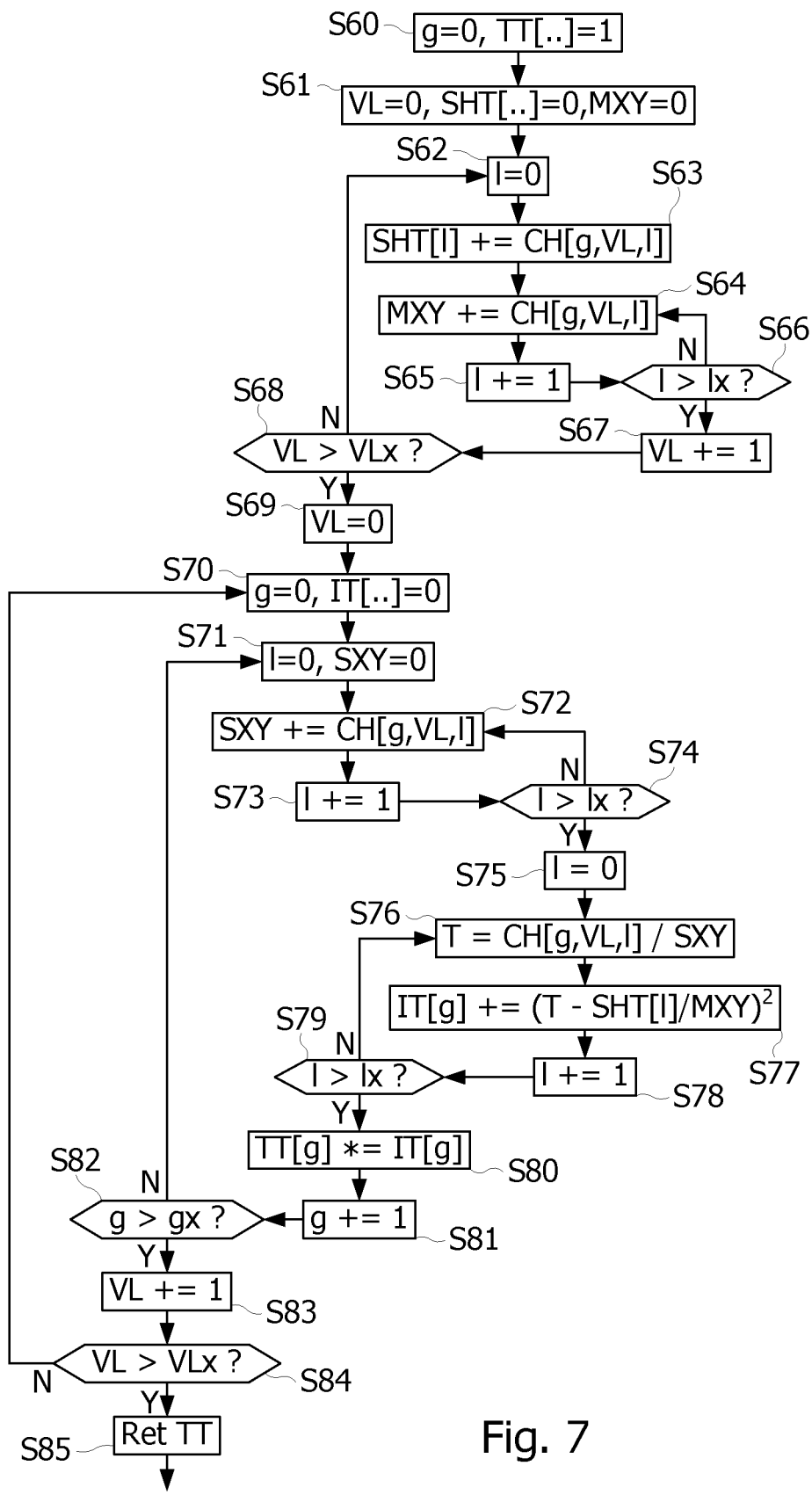
FIGS. 7 and 8 illustrate methods for statistically analyzing a value set obtained by the test method, according to various embodiments.

FIG. 7 illustrates steps S60 to S85 of an example of statistical processing of the table CH to attempt to determine the value of the part of the secret data SD searched for. Steps S60 to S66 are successively executed. In step S60, the index g is set to 0 and all the locations of a table TT are set to 1. In step S61, the index VL, a variable MXY and all the locations of a table SHT are set to 0. In step S62, the index I is set to 0. In steps S63 and S64, the value at index I in the table SHT and the variable MXY are incremented by the value CH[g,VL,I] in the table CH at indexes g, VL and I. In step S65, the index I is incremented by one (1). In step S66, the index I is compared with its maximum value Ix. If the index I has reached its maximum value Ix, steps S67 and S68 are executed, otherwise a new iteration from step S63 is executed. In step S67, the index VL is incremented by one (1). In step S68, the index VL is compared with its maximum value VLx. If the index VL has reached its maximum value VLx, steps S69 to S74 are executed, otherwise a new iteration from step S62 is executed.

In step S69, the index VL is set to 0. In step S70, the index g and all the locations of a table IT are set to 0. In step S71, the index I and a variable SXY are set to 0. In step S72, the variable SXY is incremented by the value CH[g,VL,I] in the table CH, selected by the indices g, VL, and I. In step S73, the index I is incremented by one (1). In step S74, the index I is compared with its maximum value Ix. If the index I has reached its maximum value Ix, steps S75 and S79 are executed, otherwise a new iteration from step S72 is executed.

In step S75, the index I is set to 0. In step S76, a variable T receives the value CH[g,VL,I] contained in the table CH, selected by the indices g, VL, and I, this value being divided by the variable SXY. In step S77, the value IT[g] at the location g in the table IT is incremented by the squared result of of the difference between the value of the variable T and the value SHT[I] stored in the table SHT, designated by index I, the value SHT[I] being divided by the variable MXY. In step S78, the index I is incremented by one (1). In step S79, the index I is compared with its maximum value Ix. If the index I has reached its maximum value Ix, steps S80 to S82 are executed, otherwise a new iteration from step S76 is executed.

In step S80, the value TT[g] designated by the index g in the table TT is updated by being multiplied by the value IT[g] computed in steps S76 and S77, executed Ix times. In step S81, the index g is incremented by one (1). In step S82, the index g is compared with its maximum value gx. If the index g is greater than its maximum value gx, steps S83 and S84 are executed, otherwise a new iteration from step S71 is executed. In step S83, the index VL is incremented by one (1). In step S8, the index VL is compared with its maximum value VLx. If the index VL is greater than its maximum value VLx, step S85 is executed, otherwise a new iteration from step S70 is executed. In step S75, the table TT is returned as result of the statistical analysis.

Therefore, upon the last iteration of the processing loop including steps S62 to S72, the tables IT and TT contain the following values:

$$IT[g, VL] = \sum_{I=0}^{Ix} \left[ \frac{CH[g, VL, I]}{SXY[g, VL]} - \frac{SHT[g1, I]}{MXY[g1]} \right]^2 \quad (8)$$

$$TT[g] = \prod_{VL=0}^{VLx} IT[g, VL] \quad (9)$$

where $$SXY[g, VL] = \sum_{I=0}^{Ix} CH[g, VL, I], SHT[g, I] = \sum_{VL=0}^{VLx} CH[g, VL, I],$$

$$MXY[g] = \sum_{I=0}^{Ix} SHT[g, I],$$

and g1 is any value of index g between 0 and gx (g1=0 in the example of FIG. 7).

If the secret data SD leaked when executing the operation OPR, a location of the table TT contains a much higher value than the other values stored in this table. The result is that the part of the secret data SD searched for is equal to the index g of the highest value in the table TT.

It is noted that the values of the table IT can be added rather than being multiplied in step S80 corresponding to the equation (8). The implementation of a multiplication operation merely enables the differences between the values of the table TT to be increased, and thus the highest value corresponding to the part of the secret data searched for to be better highlighted. It is also possible to consider applying the logarithm function to the values of the table IT and performing an additive accumulation of the logarithm values obtained, in the table TT. When the values of the tables IT are added, they can be weighted as follows:

$$TT[g] = \frac{1}{Ix} \sum_{VL=0}^{VLx} SXY[g, VL] \cdot IT[g, VL]. \quad (10)$$

The CHI-squared test can be implemented by dividing the values in the table IT by the values SHT[g1,I]/MXY[g1]:

$$IT[g, VL] = \sum_{I=0}^{Ix} \left[ \frac{\frac{CH[g, VL, I]}{SXY[g, VL]} - \frac{SHT[g1, I]}{MXY[g1]}}{\frac{SHT[g1, I]}{MXY[g1]}} \right]^2 \quad (11)$$

Figure 8:
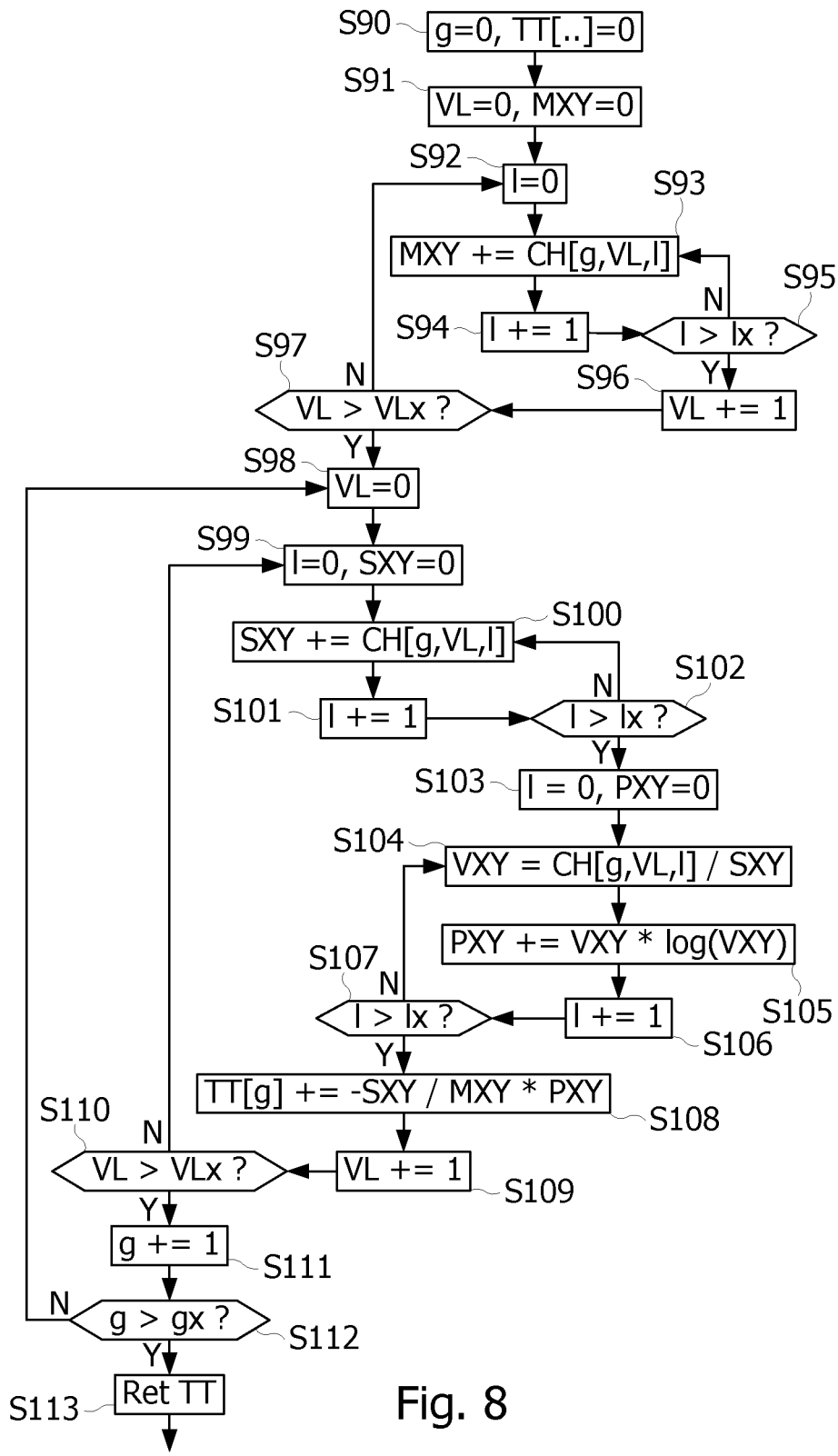

FIG. 8 illustrates steps S90 to S113 of another example of statistical processing of the table CH to attempt to determine the value of a part of the secret data SD searched for. This processing is based on the Shannon entropy function. Steps S90 to S95 are successively executed. In step S90, the index g and all the locations of the table TT are set to 0. In step S91, the index VL and a variable MXY are set to 0. In step S92, the index I is set to 0. In step S93, the variable is incremented by value CH[g,VL,I] selected in the table CH, by the indices g, VL, and I. In step S94, the index I is incremented by one (1). In step S95, the index I is compared with its maximum value Ix. If the index I has reached its maximum value Ix, steps S96 and S97 are executed, otherwise a new iteration from step S93 to step S95 is executed. In step S96, the index VL is incremented by one (1). In step S97, the index VL is compared with its maximum value VLx. If the index VL has reached its maximum value VLx, steps S98 to S102 are executed, otherwise a new iteration from step S92 to step S97 is executed.

In step S98, the index VL is set to 0. In step S99, the index I and a variable SXY are set to 0. In step S100, the variable SXY is incremented by the value CH[g,VL,I] selected in the table CH, by the indices g, VL, and I. In step S101, the index I is incremented by one (1). In step S102, the index I is compared with its maximum value Ix. If the index I has reached its maximum value Ix, steps S103 to S107 are executed, otherwise a new iteration from step S100 to step S102 is executed. In step S103, the index I and a variable PXY are set to 0. In step S104, a variable VXY receives the value CH[g,VL,I] selected in the table CH by the indices g, VL, and I, this value being divided by the variable SYX computed by iterations from step S100 to S102. In step S105, the variable PXY is incremented by the product of the variable VXY by the logarithm (for example in base 2) of the variable VXY. In step S106, the index I is incremented by one (1). In step S107, the index I is compared with its maximum value Ix. If the index I has reached its maximum value Ix, steps S108 to S110 are executed, otherwise a new iteration from step S104 to step S107 is executed.

In step S108, the value TT[g] designated by the index g in the table TT is updated by subtracting from it the product of the value SXY divided by the variable MXY multiplied by the variable PXY. In step S109, the index VL is incremented by one (1). In step S110, the index VL is compared with its maximum value VLx. If the index VL is greater than its maximum value VLx, steps S111 and S112 are executed, otherwise a new iteration from step S99 is executed. In step S111, the index g is incremented by one (1). In step S112, the index g is compared with its maximum value gx. If the index g is greater than its maximum value gx, step S113 is executed, otherwise a new iteration from step S98 is executed. In step S113, the table TT is returned as result of the statistical analysis.

Therefore, upon the last iteration, after step S112, the table TT contains the following values:

$$TT[g] = \quad (12)$$

$$-\sum_{VL=0}^{VLx} \left[ \frac{SXY[g, VL]}{MXY[g1]} \cdot \sum_{I=0}^{Ix} (VXY[g, VL, I] \cdot \log(VXY[g, VL, I])) \right]$$

where $$VXY[g, VL, I] = \frac{CH[g, VL, I]}{SXY[g, VL]}, MXY[g] = \sum_{VL=0}^{VLx} \sum_{I=0}^{Ix} CH[g, VL, I],$$

g1 is any value of index g between 0 and gx (g1=0 in the example of FIG. 8), and $$SXY[g, VL] = \sum_{I=0}^{Ix} CH[g, VL, I]$$

is computed for each of the values of the indices g and VL, and each value of the index g represents a possible value of the part of the key searched for. If the secret data SD leaked when processing the operation OPR, a location of the table TT contains a much higher value than the other values stored in this table. The result is that the part of the secret data SD searched for is equal to the index g of the highest value in the table TT.

Figure 9:
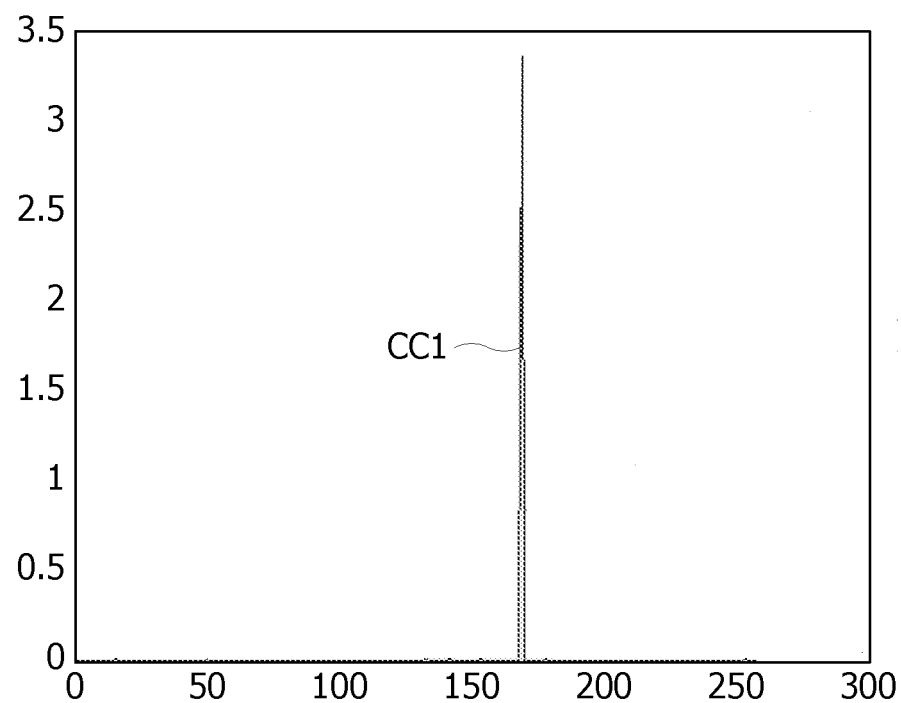
FIGS. 9 and 10 illustrate, in the form of curves, result tables provided by the analysis methods of FIGS. 7 and 8.
Figure 10:
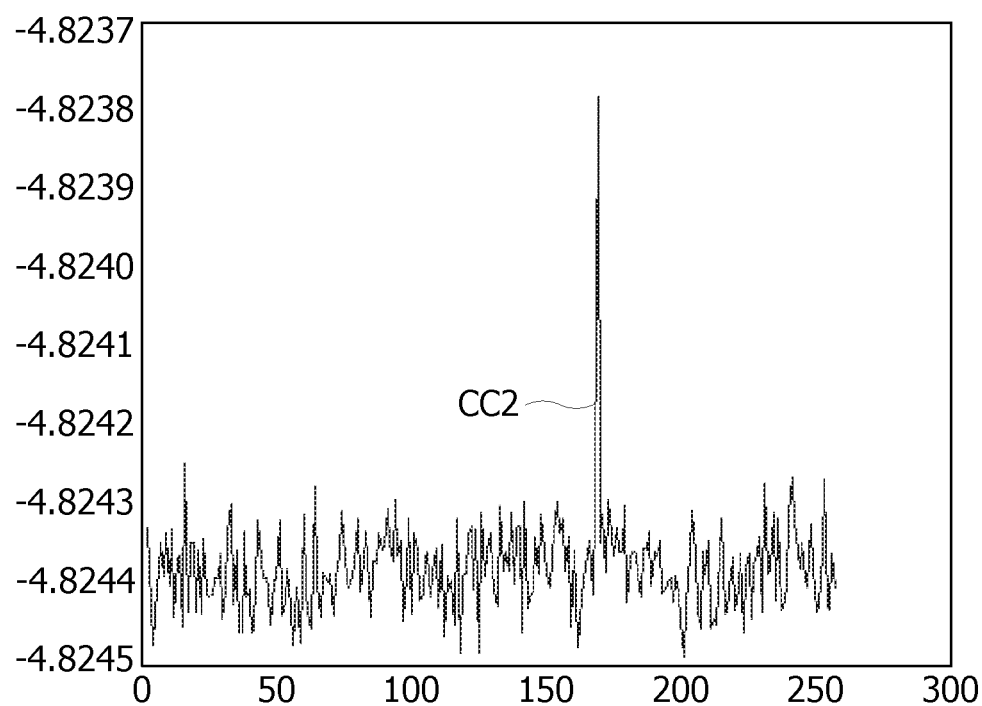

FIGS. 9 and 10 show curves CC1, CC2 illustrating an example of content of the table TT as a function of the index g. The curve CC1 was obtained by executing the steps in FIG. 7, and the curve CC2 was obtained by executing the steps in FIG. 8. In the example of FIGS. 10 and 11, the index g has a length of one byte (thus varying from 0 to 255), and curves CC1 and CC2 have been obtained from a number of traces Ci of the order of 500,000. Curves CC1 and CC2 have a clear peak at the value g=168 compared to the other values contained in the table TT. The value of the peak in the curve CC1 is greater than about thirty times the other values of the table TT. In the curve CC2, the value of the peak is greater than three times the other values of the table TT. Depending on the statistical processing of the table CH, it may be considered that the part of the secret data searched for leaks when a peak is obtained that remains at a value greater than 0.9 times the closest value, by increasing the number of analyzed traces Ci.

Circuits, such as integrated circuits, as described herein, can successfully pass known qualification or certification procedures, the designers of these circuits provide countermeasures the most conventional of which involve introducing a time variable. This arrangement can be made by causing the duration of the clock cycle supplied to the circuit to vary randomly, or by introducing dummy processing cycles or operations at times chosen randomly. The calculation of the values in the tables HT enables the time aspect to be removed from the analyzed values, and avoids having to synchronize the different traces of the analyzed values. Provided that information concerning the secret data searched for is in the analyzed data, the test method previously described may enable all or part of the secret data to be determined. The combination of signals for several partial results or operations performed at step S43 can take advantage of data leakages that can be observed at different steps of a computation. The observed partial operations are not required to behave the same or have a same leakage model or be synchronized in all the traces.

The methods disclosed therein are compatible with so-called "n-order tests" which are based on analysis of a set of signal traces each being obtained by combining n parts extracted from a same respective trace or from signal traces acquired simultaneously from the tested device or software.

The invention claimed is:

1. A test method comprising:
   acquiring a plurality of value sets, each value set including values of a physical quantity or values of logic signals, the values being linked to activity of a circuit to be tested when the circuit executes an operation of an operation set of distinct cryptographic operations applied to a same data to be discovered;
   for each operation of the operation set, and each of the possible values of a part of the data to be discovered, computing results of at least two distinct partial operations of the operation;
   for each value set and each partial operation of the operation corresponding to the value set, selecting a subset of values in the value set;
   for each selected subset of values, generating, by a processing unit, an occurrence number set including respective counts of occurrences of each transformed value in a set of transformed values resulting from application of a first surjective function to the values of the selected subset of values, the occurrence number set corresponding to the value set and the partial operation of the selected subset of values;
   computing, by the processing unit, for each partial operation result, cumulative occurrence number sets, each cumulative occurrence number set being obtained by adding together the occurrence number sets corresponding to the operations of the operation set, which, when applied to a same value or equivalent value of the possible values of the part of the data to be discovered, provide a partial operation result having a same transformed value resulting from application to the partial operation result of a second surjective function;
   combining together the cumulative occurrence number sets corresponding to each partial operation result to obtain combined cumulative occurrence number sets, the combination of the cumulative occurrence number sets being performed as a function of partial operations corresponding to the partial operation results; and
   analyzing, by the processing unit, the combined cumulative occurrence number sets to determine the part of the data to be discovered, wherein if the data to be discovered has leaked into the value sets, it is found in the cumulative occurrence number sets corresponding to a value of the part of the data to be discovered.

2. The method according to claim 1, further comprising:
   transmitting, to the circuit, a plurality of distinct commands, each command triggering the execution, by the circuit, of one of the operations of the operation set, applied to the data to be discovered, and
   during the execution, by the circuit, of one of the operations of the operation set, collecting by a measuring device, the values of one of the value sets.

3. The method according to claim 1, wherein the value sets include at least one of:
   measurements of current consumption of the circuit;
   measurements of electromagnetic radiation emitted by the circuit;
   measurements of absorption of magnetic field present around the circuit; or
   logic signals or digital values collected in the circuit.

4. The method according to claim 1, wherein each of the first surjective function and the second surjective function are one of the following functions:
   an identity function;
   a function providing a resultant value which is then reduced to a value corresponding to a Hamming weight;
   a function providing the Hamming weight of the value to which the function is applied; or
   a function providing a Hamming distance between a value and a preceding value to which the function is applied.

5. The method according to claim 1, further comprising rejecting the circuit, or a program executed by the circuit, if the analyzing determines the part of the data to be discovered.

6. The method according to claim 1, further comprising, for a previously determined part of the data to be discovered and another part of the data to be discovered:
  computing an operation result for each of the possible values of a part of the data to be discovered;
  computing the cumulative occurrence number sets;
  combining the cumulative occurrence number sets; and
  analyzing the combined cumulative occurrence number sets.

7. The method according to claim 1, wherein the selected values in each value set include at least one of:
  consecutive values of the value set;
  non-consecutive values of the value set;
  local extremum values of the value set; or
  all the values of the value set.

8. The method according to claim 1, wherein the operations of the operation set include applying a single operation to the data to be discovered and to an input data of a set of input data.

9. The method according to claim 1, wherein the partial operations include at least a part of one of the following operations:
  a symmetrical or asymmetrical encryption or decryption operation;
  a signature operation;
  an authentication operation;
  a modular or non-modular multiplication by the data to be discovered;
  a logic Exclusive OR operation with the data to be discovered;
  a modular exponentiation operation, the data to be discovered being used as exponent;
  a scalar multiplication operation of a secret data by a point on an elliptic curve;
  a modular reduction operation, the data to be discovered being used as modulus;
  a substitution operation by a value selected in a substitution table using an input value;
  an arithmetic operation applied to the data to be discovered;
  a partial operation performed within an AES or DES round; or
  an operation combining a logic Exclusive OR operation with the data to be discovered and a substitution operation replacing the result of the logic operation with a value selected in a substitution table using the result of the logic operation.

10. The method according to claim 1, wherein the analyzing the combined cumulative occurrence number sets includes:
  for each combined cumulative occurrence number set, computing a normalized cumulative occurrence number by dividing the combined cumulative occurrence number by a corresponding total number of occurrence numbers accumulated in the combined cumulative occurrence number set;
  for each possible value of the part of the data to be discovered and each transformed value of the partial operation results, computing a sum of squared differences between each normalized cumulative occurrence number corresponding to the possible value of the part of the data to be discovered and the transformed value of the partial operation results, and an average value of the cumulative occurrence numbers;
  for each possible value of the part of the data to be discovered, computing a cumulative total of difference sums corresponding to the transformed values of the partial operation results; and
  comparing, with each other, the cumulative totals of difference sums, and detecting whether one of the cumulative totals of difference sums for a possible value of the part of the data to be discovered is greater than other cumulative totals of difference sums.

11. The method according to claim 1, wherein the analyzing the combined cumulative occurrence number sets includes:
  for each possible value of the part of the data to be discovered and each transformed value of the partial operation results, computing a cumulative total of the cumulative occurrence numbers;
  for each occurrence number in the combined cumulative occurrence number sets, computing a normalized cumulative total by dividing the combined cumulative occurrence numbers by a corresponding cumulative total, and computing a product of the normalized cumulative total by a logarithm of the normalized cumulative total;
  for each possible value of the part of the data to be discovered and each transformed value of the partial operation results, computing a sum of products corresponding to the possible value of the part of the data to be discovered and the transformed value of the partial operation results;
  for each possible value of the part of the data to be discovered, computing a cumulative total of the product sums corresponding to the transformed values of the partial operation results, each product sum being multiplied by an average value of the cumulative total corresponding to the possible values of the part of the data to be discovered and the transformed value of the partial operation results; and
  comparing, with each other, the cumulative totals of product sums, and detecting whether one of the cumulative totals of product sums for a possible value of the part of the data to be discovered is greater than other cumulative totals of product sums.

12. A system for testing a circuit, the system comprising:
  a measuring device configured to acquire a plurality of value sets, each value set including values of a physical quantity or values of logic signals, the values being linked to activity of a circuit to be tested during execution, by the circuit, of an operation of an operation set of distinct cryptographic operations applied to a same data to be discovered, and
  a processing unit configured to:
  receive the plurality of value sets;
  for each operation of the operation set, and each of the possible values of a part of the data to be discovered, compute results of at least two distinct partial operations of the operation;
  for each value set and each partial operation of the operation corresponding to the value set, select a subset of values in the value set;
  for each selected subset of values, generate an occurrence number set including respective counts of occurrences of each transformed value in a set of transformed values resulting from application of a first surjective function to values of the selected subset of values, the occurrence number set corresponding to the value set and the partial operation of the selected subset of values;
  compute, for each partial operation result, cumulative occurrence number sets, each cumulative occurrence number set being obtained by adding together the occurrence number sets corresponding to the operations of the operation set, which, when applied to a same value or equivalent value of the possible values of the part of the data to be discovered, provide a partial operation result having a same transformed value resulting from application to the partial operation result of a second surjective function;

combine together the cumulative occurrence number sets corresponding to each partial operation result to obtain combined cumulative occurrence number sets, the combination of the cumulative occurrence number sets being performed as a function of partial operations corresponding to the partial operation results; and analyze the combined cumulative occurrence number sets to determine the part of the data to be discovered, wherein if the data to be discovered has leaked into the value sets, it is found in the cumulative occurrence number sets corresponding to a value of the part of the data to be discovered.

13. The system according to claim 12, further comprising a measuring probe coupled to the measuring device, the measuring probe being configured to acquire signal traces linked to the activity of the circuit.

14. The system according to claim 12, wherein the selected values in each value set include at least one of:
consecutive values of the value set;
non-consecutive values of the value set;
local extremum values of the value set; or
all the values of the value set.

15. The system according to claim 12, configured to:
transmit, to the circuit, a plurality of distinct commands, each command triggering execution, by the circuit, of one of the operations of the operation set, applied to the data to be discovered, and during the execution by the circuit of one of the operations of the operation set, collect, by a measuring device, the values of one of the value sets.

16. The system according to claim 12, wherein the value sets include at least one of:
measurements of current consumption of the circuit;
measurements of electromagnetic radiation emitted by the circuit;
measurements of absorption of magnetic field present around the circuit; or
logic signals or digital values collected in the circuit.

17. The system according to claim 12, wherein each of the first surjective function and the second surjective function are one of the following functions:
an identity function;
a function providing a resultant value which is then reduced to a value corresponding to a Hamming weight;
a function providing the Hamming weight of the value to which the function is applied; or
a function providing a Hamming distance between a value and a preceding value to which the function is applied.

18. The system according to claim 12, configured to reject the circuit, or a program executed by the circuit, if the analyzing determines the part of the data to be discovered.

19. The system according to claim 12, wherein the processing unit is further configured to, for a previously determined part of the data to be discovered and another part of the data to be discovered:
compute an operation result for each possible value of a part of the data to be discovered;
compute the cumulative occurrence number sets;
combine the cumulative occurrence number sets; and
analyze the combined cumulative occurrence number sets.

20. The system according to claim 12, wherein the operations of the operation set include a single operation to the data to be discovered and to an input data of a set of input data.

21. The system according to claim 12, wherein the partial operations include at least a part of one of the following operations:
a symmetrical or asymmetrical encryption or decryption operation;
a signature operation;
an authentication operation;
a modular or non-modular multiplication by the data to be discovered;
a logic Exclusive OR operation with the data to be discovered;
a modular exponentiation operation, the data to be discovered being used as exponent;
a scalar multiplication operation of a secret data by a point on an elliptic curve;
a modular reduction operation, the data to be discovered being used as modulus;
a substitution operation by a value selected in a substitution table using an input value;
an arithmetic operation applied to the data to be discovered;
a partial operation performed within an AES or DES round; or
an operation combining a logic Exclusive OR operation with the data to be discovered and a substitution operation replacing a result of the logic operation with a value selected in a substitution table using the result of the logic operation.

22. The system according to claim 12, wherein the analyzing the combined cumulative occurrence number sets includes:
for each combined cumulative occurrence number set, computing a normalized cumulative occurrence number by dividing the combined cumulative occurrence number by a corresponding total number of occurrence numbers accumulated in the combined cumulative occurrence number set;
for each possible value of the part of the data to be discovered and each transformed value of the partial operation results, computing a sum of squared differences between each normalized cumulative occurrence number corresponding to the possible value of the part of the data to be discovered and the transformed value of the partial result, and an average value of the cumulative occurrence numbers;
for each possible value of the part of the data to be discovered, computing a cumulative total of difference sums corresponding to the transformed values of the partial operation results; and
comparing, with each other, the cumulative totals of difference sums, and detecting whether one of the cumulative totals of difference sums for a possible value of the part of the data to be discovered is greater than other cumulative totals of difference sums.

23. The system according to claim 12, wherein the analyzing the combined cumulative occurrence number sets includes:
for each possible value of the part of the data to be discovered and each transformed value of the partial operation results, computing a cumulative total of the cumulative occurrence numbers;

for each occurrence number in the combined cumulative occurrence number sets, computing a normalized cumulative total by dividing the combined cumulative occurrence numbers by a corresponding cumulative total, and computing a product of the normalized cumulative total by a logarithm of the normalized cumulative total;

for each possible value of the part of the data to be discovered and each transformed value of the partial operation results, computing a sum of products corresponding to the possible value of the part of the data to be discovered and the transformed value of the partial operation results;

for each possible value of the part of the data to be discovered, computing a cumulative total of the product sums corresponding to the transformed values of the partial operation results, each product sum being multiplied by an average value of the cumulative total corresponding to the possible values of the part of the data to be discovered and the transformed value of the partial operation results; and comparing, with each other, the cumulative totals of product sums, and detecting whether one of the cumulative totals of product sums for a possible value of the part of the data to be discovered is greater than other cumulative totals of product sums.

24. A non-transitory computer readable medium carrying one or more sequences of instructions, which, when executed by one or more processors, cause the one or more processors to:

acquire a plurality of value sets, each value set including values of a physical quantity or values of logic signals, the values being linked to activity of a circuit to be tested when the circuit executes an operation of an operation set of distinct cryptographic operations applied to a same data to be discovered;

for each operation of the operation set, and each of the possible values of a part of the data to be discovered, compute results of at least two distinct partial operations of the operation;

for each value set and each partial operation of the operation corresponding to the value set, select a subset of values in the value set;

for each selected subset of values, generate an occurrence number set including respective counts of occurrences of each transformed value in a set of transformed values resulting from application of a first surjective function to values of the selected subset of values, the occurrence number set corresponding to the value set and the partial operation of the selected subset of values;

compute, by the one or more processors, for each partial operation result, cumulative occurrence number sets, each cumulative occurrence number set being obtained by adding together the occurrence number sets corresponding to the operations of the operation set, which, when applied to a same value or equivalent value of the possible values of the part of the data to be discovered, provide a partial operation result having a same transformed value resulting from application to the partial operation result of a second surjective function;

combine together the cumulative occurrence number sets corresponding to each partial operation result to obtain combined cumulative occurrence number sets, the combination of the cumulative occurrence number sets being performed as a function of partial operations corresponding to the partial operation results; and analyze, by the one or more processors, the combined cumulative occurrence number sets to determine the part of the data to be discovered, wherein if the data to be discovered has leaked into the value sets, it is found in the cumulative occurrence number sets corresponding to the value of the part of the data to be discovered.

* * * * *